United States Patent
Takeshita

(10) Patent No.: US 7,746,389 B2
(45) Date of Patent: Jun. 29, 2010

(54) IMAGE CAPTURE APPARATUS INCLUDING GENERATION OF BACKUP DATA

(75) Inventor: Yukitaka Takeshita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 513 days.

(21) Appl. No.: 11/790,166

(22) Filed: Apr. 24, 2007

(65) Prior Publication Data
US 2007/0279499 A1    Dec. 6, 2007

(30) Foreign Application Priority Data
Apr. 25, 2006    (JP) ............................. 2006-120159

(51) Int. Cl.
*H04N 5/76*    (2006.01)
(52) U.S. Cl. ............... 348/231.2; 348/231.1; 348/231.3
(58) Field of Classification Search ............ 348/231.99, 348/231.1, 231.2, 231.3, 222.1
See application file for complete search history.

(56) References Cited

U.S. PATENT DOCUMENTS

| | | | |
|---|---|---|---|
| 6,711,297 B1 * | 3/2004 | Chang et al. ................. | 382/240 |
| 6,845,182 B2 * | 1/2005 | Matsuo ......................... | 382/305 |
| 6,871,009 B1 * | 3/2005 | Suzuki .......................... | 386/95 |
| 7,079,181 B2 * | 7/2006 | Dow et al. ................. | 348/231.1 |
| 2003/0156207 A1 * | 8/2003 | Kalinski ................... | 348/231.1 |
| 2005/0174443 A1 * | 8/2005 | Niimura et al. ........... | 348/231.2 |

FOREIGN PATENT DOCUMENTS

| JP | 2001-24928 A | 1/2001 |
|---|---|---|
| JP | 2003-199020 A | 7/2003 |

* cited by examiner

*Primary Examiner*—Jason Chan
*Assistant Examiner*—Nicholas G Giles
(74) *Attorney, Agent, or Firm*—Sughrue Mion, PLLC

(57) ABSTRACT

A digital camera generates principal image data of a predetermined size and backup image data of a maximum size, and records the principal image data and the backup image data in a memory card and an internal memory respectively. In a resize processing in a replay mode, if the backup image data corresponding to the principal image data has been recorded, and a designated size is larger than the principal image data, a resize processing section reads the backup image data from the internal memory and performs the resize processing to the backup image data.

16 Claims, 13 Drawing Sheets

IMAGE CAPTURE APPARATUS INCLUDING GENERATION OF BACKUP DATA

FIELD OF THE INVENTION

The present invention relates to an image capture apparatus for capturing images and recording image data of the captured images.

BACKGROUND OF THE INVENTION

Digital cameras and mobile phones with cameras are widely used as image capture apparatuses. Such image capture apparatuses capture an image of a subject with an image sensor such as a CCD, and convert image signals from the CCD into digital image data, and record the digital image data in an internal memory, a memory card, or the like. Japanese Patent Laid-Open Publications No. 2001-024928 and No. 2003-199020 disclose image capture apparatuses which perform image processing under several processing conditions to image signals obtained by one image capture operation to convert the image signals into plural image data of different sizes and image qualities, and record such image data in a memory.

Resizing function to change a size of the image data is known. Since the resizing function is intended for the data of captured image, the image can be resized only to a smaller size but not to a larger size than the original image data. Accordingly, if the image is mistakenly captured in a relatively small size such as VGA (640×480 dots), it is necessary to recapture the image with a correct image data size or to use the small-sized image without recapturing. Further, in the case, for instance, the user is intentionally capturing the image with a small image size and unexpectedly captures a best scene, it is also impossible to increase the image data size after the image is captured.

In the above prior art, the image is captured with the maximum size, and various image data with different sizes and image qualities are generated therefrom and recorded. Therefore, the above inconvenience has been solved. However, due to the large image size, the image processing takes a long time, and high consumption power is necessary. Moreover, due to the enormous amount of image data, the memory runs out in a short time.

SUMMARY OF THE INVENTION

In view of the foregoing, a primary object of the present invention is to provide an image capture apparatus capable of changing a size of image data of a captured image to a larger size.

Another object of the present invention is to provide an image capture apparatus in which various processing of image data of the captured image is facilitated.

In order to achieve the above and other objects, the image capture apparatus of the present invention includes an image processing section for generating principal image data of a predetermined size, and backup image data of a size larger than the principal image. The principal image data and the backup image data are written in a memory by a memory control section.

The image capture apparatus includes a first resize processing section for performing resizing processing to change a size of the captured image stored in the memory. If a size of image data after the resize processing becomes larger than that of the principal image data, it is preferable that the first resize processing section performs the resize processing to the backup image data. If a size of image data after the resize processing becomes smaller than that of the principal image data, it is preferable that the first resize processing section performs resize processing to the principal image data.

It is preferable that the memory has a backup image recording area for storing a predetermined number of frames of the backup image data. If the backup image data recording area does not have a sufficient space, it is preferable that the memory control section deletes the earliest backup image data from the backup image data recording area and records the latest backup image data in the backup image data recording area. It is preferable that the memory is an internal memory incorporated in a main body of the image capture apparatus.

The memory has a backup image data recording area for recording predetermined number of frames of the backup image data, and a shared memory area in which both the principal image data and the backup image data are recorded. If the backup image recording area does not have the sufficient space, and the shared memory area has a sufficient space, the memory control section transfers the earliest backup image data from the backup image data recording area to the shared memory area, and records the latest backup image data in the backup image data recording area. If the shared memory area does not have a sufficient space, it is preferable that the memory control section deletes the earliest backup image data from the shared memory area, and records the latest principal image data or the latest backup image data in the shared memory area.

It is preferable that the memory includes an internal memory incorporated in the main body of the image capture apparatus and an external memory removably installed to the main body, and the internal memory has the backup image data recording area, and the external memory has the shared memory area.

It is preferable that the image capture apparatus includes a display section for displaying a recordable frame number of the principal images, which is estimated from a remaining space in the memory, and the display section displays the recordable frame number added with a number of frames corresponding to an amount of said backup image data recorded in the shared memory area.

It is preferable that the image capture apparatus includes a first operation unit for changing the recordable frame number in the backup image data recording area. It is preferable that the image capture apparatus includes a second operation unit for deleting all of the backup image data at once.

If the principal image data is designated to be the same size as the backup image data, it is preferable that the memory control section only records the principal image data. It is preferable that the image capture apparatus includes a trimming processing section for performing trimming processing to trim the backup image data. If the trimmed backup image data is larger than the principal image data, it is preferable that the image capture apparatus includes a second resize processing section for changing the trimmed backup image data to be the same size as the principal image data.

The image capture apparatus includes a color conversion processing section for converting a color tone of the image data from a standard color tone into other color tone. If the backup image is recorded in the standard color tone, and the color tone of the principal image has been converted into other color tone, the color tone of the principal image is restored to the standard color tone by rewriting the principal image with the backup image as a new principal image. It is preferable that the image capture apparatus includes a third resize processing section for changing the backup image data to be the same size as the principal image data when the color tone of the principal image data is restored to the standard color tone.

It is preferable that the image capture apparatus includes a third operation unit for allowing a user to select whether to automatically replace the principal image data with the backup image data at the time of recording the principal image data and the backup image data in the memory after an image is captured. It is preferable that the backup image data is image data of a maximum size or RAW data obtained by performing analog signal processing and A/D conversion to the image signal.

According to the present invention, since the image capture apparatus generates both the principal image data of a predetermined size and the backup image data larger than the principal image data, and records these image data in the memory, it becomes possible to change the size of the image data to a larger size than the image data of the captured image. Further, the backup image data is efficiently utilized in various image processing. Therefore, the present invention enhances the convenience of the user.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein:

FIGS. 6A and 6B are examples of displays on an LCD in the resize processing: wherein FIG. 6A shows the state where the backup image data has been recorded; and FIG. 6B shows the state where the backup image data has not been recorded;

FIGS. 10A, 10B, and 10C are examples of displays on the LCD in the color tone conversion processing: wherein FIG. 10A shows the state where the color tone of the principal image is standard color tone; FIG. 10B shows the state where the color tone of the principal image is other than the standard color tone and the backup image data has been recorded; and FIG. 10C shows the state where the color tone of the principal image is other than standard color tone and the backup image has not been recorded;

DESCRIPTION OF THE PREFERRED EMBODIMENTS

Figure 1:
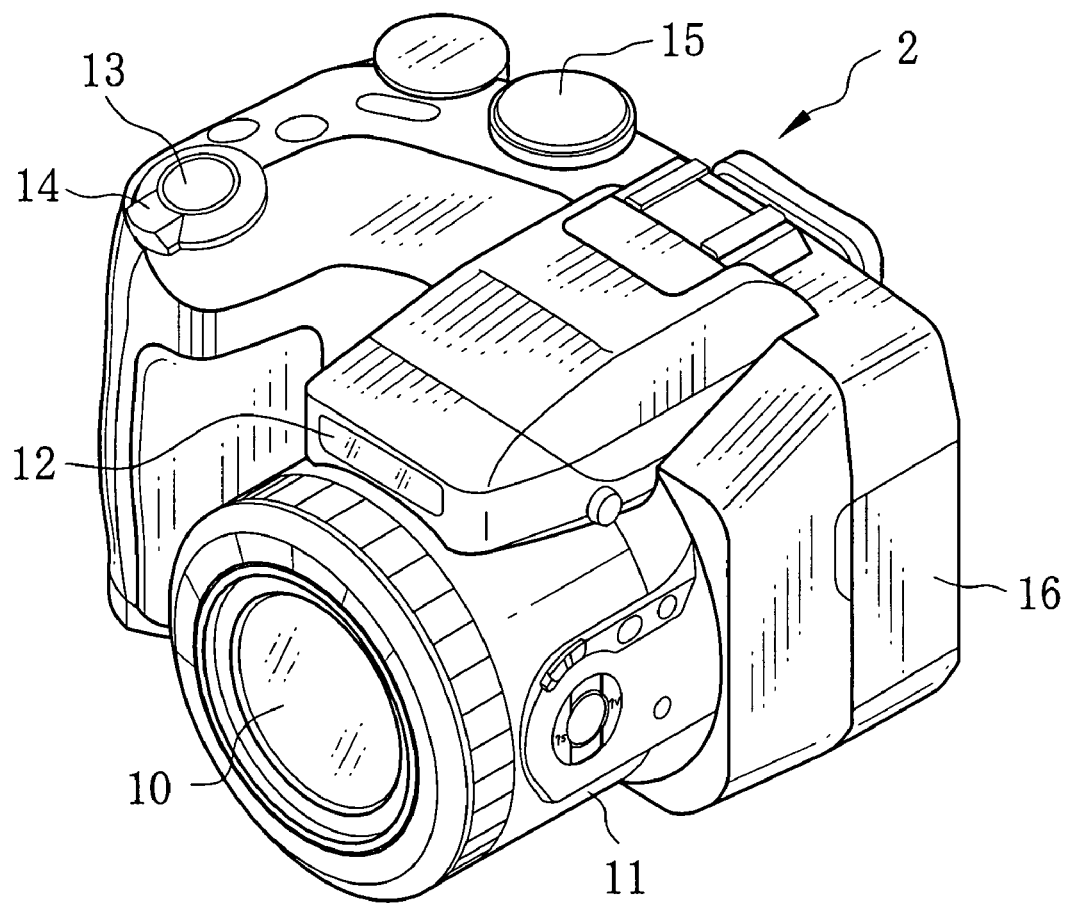
FIG. 1 is a front perspective view of a digital camera according to the present invention.
Figure 2:
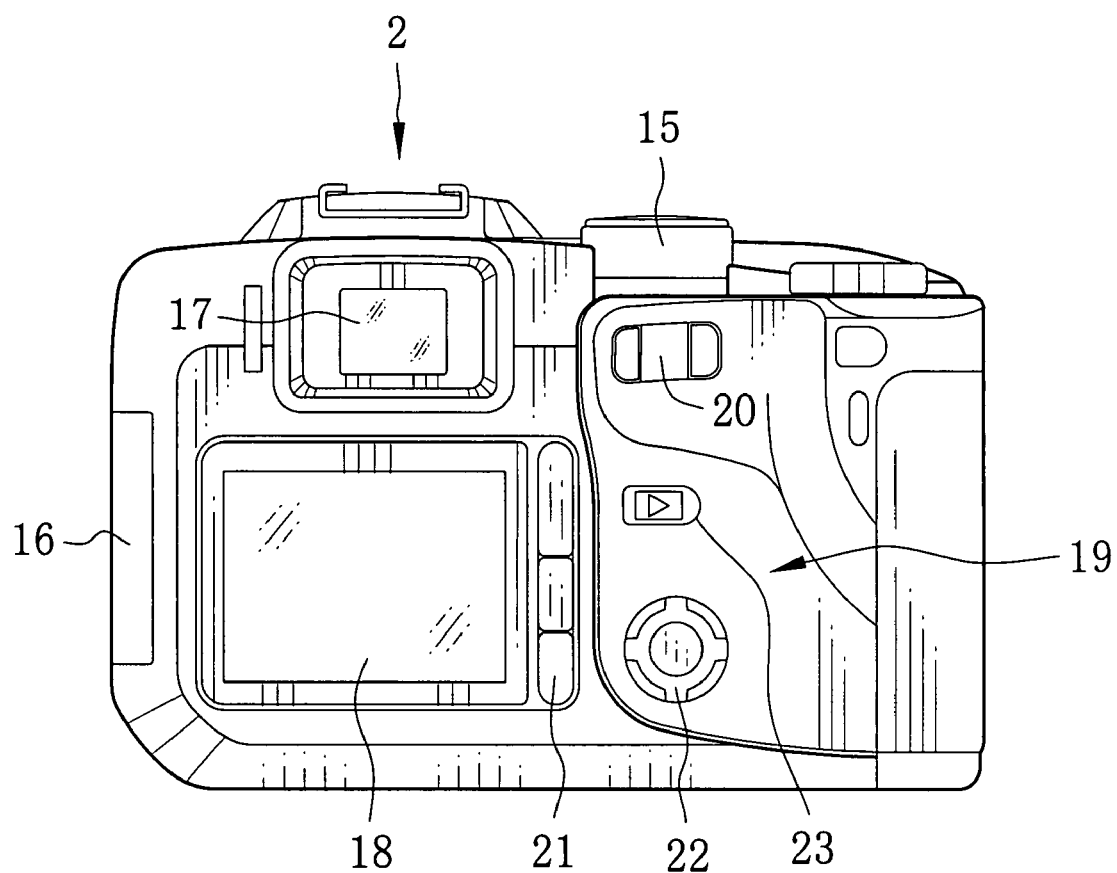
FIG. 2 is a rear external view of the digital camera.

In FIGS. 1 and 2, a lens barrel 11 for holding a taking lens 10 is attached to a front surface of a digital camera 2 according to the present invention. Above the lens barrel 11, a front viewfinder window 12 is provided. On a top surface of the digital camera 2, a release button 13, a power switch 14, and a mode selection dial 15 are provided. On a lateral side, a lid 16 is provided. A memory card slot (not shown) is exposed upon opening of the lid 16. A memory card 49 (see FIG. 3) is removably inserted in the memory card slot.

On a rear surface of the digital camera 2, a rear viewfinder window 17, a liquid crystal display (LCD) 18, and an operation unit 19 are provided. The front viewfinder window 12 and the rear viewfinder window 17 constitute an electrical viewfinder. The LCD 18 displays images read from the memory card 49, through images, and various menu screens. The operation unit 19 is constituted of a zoom button 20, a menu button 21, a cross key 22, a replay button 23, and the like. The zoom button 20 shifts a zoom lens (not shown) of the taking lens 10 to a wide angle end or a telephoto end. The menu button 21 is operated to display a menu screen or to select an item on the menu screen. The cross key 22 is operated to move a cursor on the menu screen.

The release button 13 is pressed in two steps. When the release button 13 is half-pressed after a framing of a subject is determined through an electrical viewfinder or the LCD 18, various preparatory processes for capturing the image, such as determination of an exposure condition (AE) and autofocus adjustment (AF) are performed. In this state, with the full press of the release button 13, an image is captured under the determined exposure condition.

The mode selection dial 15 is operated to selectively switch among a still image capture mode for capturing a still image, a movie capture mode for capturing a movie, and a setting mode for setting various settings. With the pressing of the replay button 23, the mode is switched between the selected capture mode and a replay mode in which the captured image is displayed on the LCD 18. When the replay button 23 is pressed for a certain period of time in a power-off state, the power is turned on in the replay mode.

In the still image capture mode, with the operation of the operation unit 19, a size of image data is selected from, for instance, five options including VGA (640×480 dots), SVGA (800×600 dots), XGA (1024×768 dots), SXGA (1280×1024 dots), and UXGA (1600×1200 dots). It is also possible to select a color tone of the image from, for instance, standard color tone, monochrome, sepia, and chrome.

In the replay mode, a resize processing, a trimming processing, and a color tone conversion processing can be performed. In the movie capture mode, ambient sounds are recorded through a built-in microphone (not shown) while the movie is captured.

Figure 3:
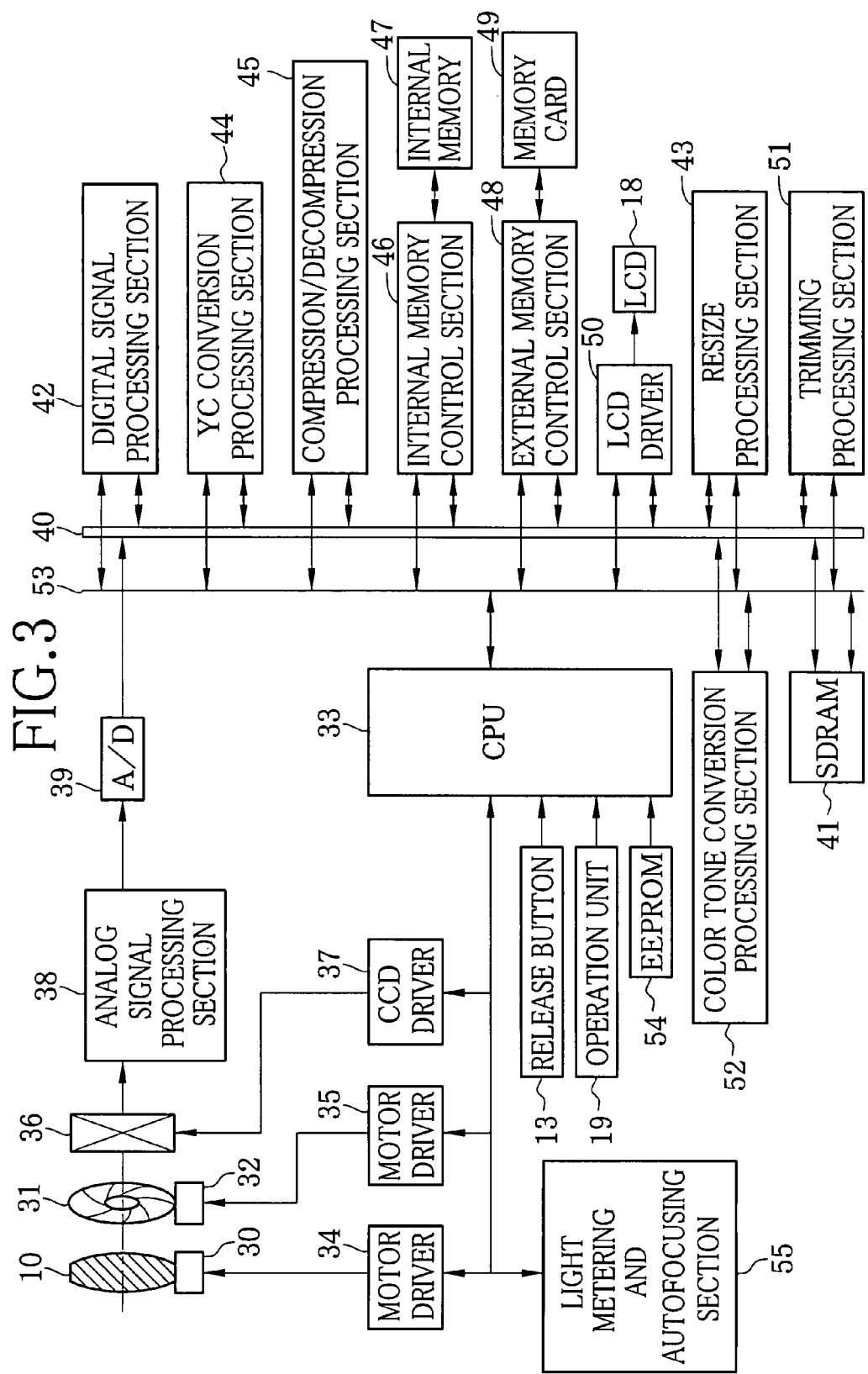
FIG. 3 is a block diagram showing an electric configuration of the digital camera.

In FIG. 3, a lens motor 30 is connected to the taking lens 10. An iris motor 32 is connected to an aperture stop 31. The motors 30 and 32 are stepping motors. Operations of the motors 30 and 32 are controlled by drive pulses sent from motor drivers 34 and 35 connected to a CPU 33 respectively.

With the operation of the zoom button 20 (see FIG. 2), the lens motor 30 shifts the zoom lens stepwise to the wide angle end or the telephoto end. At each focal distance, the lens motor 30 moves a focus lens (not shown) to an in-focus position. The iris motor 32 drives the aperture stop 31 to adjust an aperture diameter.

At the rear of the taking lens 10 and the aperture stop 31, a CCD 36 which captures a subject image is disposed. To the CCD 36, a CCD driver 37 controlled by the CPU 33 is connected. The CCD driver 37 outputs a timing signal (a clock pulse) to the CCD 36. The timing signal controls a charge accumulation time and a charge discharge timing of the CCD 36.

An image signal output from the CCD 36 is input to an analog signal processing section 38 which performs a correlated double sampling to the image signal and outputs image signals of R, G, and B each of which precisely corresponds to an accumulated charge amount in each cell of the CCD 36. The image signals are amplified with a predetermined amplifying factor and then output to an A/D converter (A/D) 39.

The A/D 39 performs an A/D conversion to the image signal to output digital image data (hereinafter referred to as CCD-RAW data). The CCD-RAW data output from the A/D 39 is input to an SDRAM 41 through a data bus 40, and temporarily stored in the SDRAM 41. The analog signal processing section 38 and the A/D 39 are synchronously driven, in response to the timing signal input from a timing generator (not shown), to output the CCD-RAW data at a predetermined frame rate.

A digital signal processing section 42 reads the CCD-RAW data from the SDRAM 41, and performs various image processing such as a gradation conversion, a white balance correction, and a gamma correction to the CCD-RAW data. Thereafter, the image data is output to a resize processing section 43.

The resize processing section 43 performs thinning and/or interpolation of the pixels to the image data and generates image data of the size selected with the operation of the operation unit 19 (hereinafter referred to as principal image data) and image data of the largest size, in this case, the UXGA (hereinafter referred to as backup image data). The principal image data and the backup image data are stored in the SDRAM 41.

A YC conversion processing section 44 reads the CCD-RAW data from the SDRAM 41, and performs a simplified YC conversion in which the RGB signals are converted into a luminance signal Y and color difference signals Cr and Cb. Further, the YC conversion processing section 44 reads the principal image data and the backup image data from the SDRAM 41 and performs a regular YC conversion thereto.

Thereafter, the principal image data and the backup image data are compressed in a predetermined format (for instance, JPEG format) in a compression/decompression processing section 45. The compressed principal image data and the backup image data are stored in the SDRAM 41.

The backup image data is read from the SDRAM 41 to an internal memory control section 46, and recorded in an internal memory 47 under the control of the internal memory control section 46. The internal memory 47 has a backup image data recording area in which a predetermined number of frames (one to several frames) of the backup image data are recorded. The number of recordable frames can be changed with the operation of the operation unit 19. It is also possible to delete all the backup image data at once with the operation of the operation unit 19. It is also possible to record the principal image data in the internal memory 47 with the operation of the operation unit 19. In this case, the principal image data is recorded in a recording area of the internal memory 47 other than the backup image data recording area.

If the predetermined number of the frames has already been recorded in the backup image data recording area, the internal memory control section 46 deletes the earliest backup image data, and records the latest backup image data. That is, the earliest backup image data is sequentially replaced with the latest backup image data every time an image is captured.

In the still image capture mode, if the user selects the image size of the UXGA, which is the same size as the backup image data, the internal memory control section 46 does not record the backup image data in the internal memory 47, since the principal image data and the backup image data have the same size.

The principal image data is read from the SDRAM 41 to an external memory control section 48. Under the control of the external memory control section 48, the principal image data is recorded in the memory card 49. The principal image data and the backup image data are associated to each other by, for instance, a file name, tag information, or the like.

The backup image data recorded in the internal memory 47 and the principal image data stored in the memory card 49 are temporarily stored in the SDRAM 41 through the internal memory control section 46 and the external memory section 48 respectively. The backup image data and the principal image data are read in the compression/decompression section 45 and decompressed to the pre-compressed size.

A VRAM (not shown) is connected to an LCD driver 50. The VRAM stores two frames of the CCD-RAW data after the simplified YC conversion by the YC conversion processing section 44. The CCD-RAW data is read from one of the two frames while the next CCD-RAW data is written in the other frame. The LCD driver 50 converts the CCD-RAW data read from the VRAM into an analog composite signal, and displays the composite signal as a through image on the LCD 18. Also, the LCD driver 50 displays the image data decompressed in the compression/decompression processing section 45 as a captured image on the LCD 18.

In the resize processing in the replay mode, if the backup image data corresponding to the principal image data has not been recorded, or the size selected by the user is smaller than the principal image data (i.e., the selected size in the still image capture mode) regardless of the presence of the backup image data, the resize processing section 43 reads the principal image data from the memory card 49 and performs the resize processing to the principal image data.

On the other hand, if the backup image data corresponding to the principal image data has been recorded, and the size selected by the user is larger than the principal image data, the resize processing section 43 reads the backup image data from the internal memory 47 and performs the resize processing to the backup image data.

A trimming processing section 51 performs trimming processing to the image data, that is, to cut out a portion of the image. In the trimming processing in the replay mode, if the backup image data corresponding to the principal image data has been recorded, the trimming processing section 51 reads the backup image data from the internal memory 47, and performs trimming to the backup image data.

On the other hand, if the backup image data corresponding to the principal image data has not been recorded, the trimming processing section 51 reads the principal image data from the memory card 49 and performs the trimming processing to the principal image data.

After the trimming processing of the backup image data, the trimmed backup image data may become larger than the principal image data (depending on how the image data is trimmed). In this case, the size of the trimmed backup image data is changed to be the same as that of the principal image data in the resize processing section 43.

A color tone conversion processing section 52 performs a color tone conversion processing in which a color tone of the image is converted from standard color tone to one of monochrome, sepia, and chrome. In the still image capture mode, the color tone conversion processing section 52 performs color conversion processing only to the principal image, and not to the backup image. In other words, the backup image is always recorded in the standard color tone.

In the color tone conversion processing of the replay mode, if the color tone of the principal image data has already been converted into one of the monochrome, sepia, and chrome in the color conversion processing section 52 and recorded, and then the user selects to convert the color tone of the image into the standard color tone with the operation of the operation unit 19, the size of the backup image is changed to be the same as that of the principal image in the resize processing section 43 and used as the principal image. Thus, with the use of the resized backup image, the color tone of the principal image is restored to the standard color tone.

Each time after the resize processing, the trimming processing, and the color tone conversion processing of the replay mode, the image data is compressed in the compression/decompression processing section 45, and stored in the SDRAM 41. The external memory control section 48 deletes the original principal image data from the memory card 49, and rewrites it with the compressed image data in the SDRAM 41, as new principal image data.

The CPU 33 sends the control signal to each section through a control bus 53 and receives a response signal from each section to integrally control the operation of each section. To the CPU 33, the release button 13, the operation unit 19, and an EEPROM 54 are connected. The EEPROM 54 stores various control programs and setting information. The CPU 33 receives the operation signal from the release button 13 and makes each section execute the processing in accordance with the half-press and the full press of the release button 13. The CPU 33 activates each section in accordance with the operation signal input from the operation unit 19, and reads various information from the EEPROM 54 to the built-in RAM to execute processing.

A light metering and autofocusing section 55 is connected to the CPU 33. The light metering and autofocusing section 55 detects brightness of a subject and a distance between the subject and the digital camera (subject distance). On the basis of the detected results, an exposure amount, a white balance correction amount, and a setting position of the focus lens are determined.

The light metering and autofocusing section 55 is activated at a predetermined cycle during the display of the through images. At that time, the iris motor 32 is activated by the motor driver 35 to control the aperture diameter of the aperture stop 31. If an appropriate exposure amount cannot be achieved only through the adjustment of the aperture diameter, the charge accumulation time of the CCD 36 is controlled by the CCD driver 37.

The light metering and autofocusing section 55 starts the detection of the brightness and the subject distance when the release button 13 is half-pressed, and sequentially sends the detected results to the CPU 33. On the basis of the detected results, the CPU 33 controls the operation of the taking lens 10, the aperture stop 31, and the CCD 36.

Next, referring to FIGS. 4 to 10, an operation of the digital camera 2 of the above configuration is described. To capture a still image with the digital camera 2, the power of the digital camera 2 is turned on with the operation of the power switch 14. Then, the mode selection dial 15 is operated and the still image capture mode is selected.

In the still image capture mode, a subject image, entered through the taking lens 10 and the aperture stop 31, is focused on an imaging surface of the CCD 36, and thereby an image signal is output from the CCD 36. The image signal output from the CCD 36 is subjected to the correlated double sampling and amplified in the analog signal processing section 38, and then converted into digital image data, that is, CCD-RAW data, in the A/D 39.

The CCD-RAW data is input in the SDRAM 41 through the data bus 40, and temporarily stored in the SDRAM 41. Then, the CCD-RAW data is subjected to the simplified YC conversion in the YC conversion processing section 44, and stored in the VRAM. The CCD-RAW data is sequentially read to the LCD driver 50, and converted into a composite signal in the LCD driver 50, and displayed as a through image on the LCD 18.

When the release button 13 is half-pressed during the display of the through images, the light metering and autofocusing section 55 detects the brightness of the subject and the subject distance, and determines the exposure amount, the white balance correction amount, and the focal distance. On the basis of the detected results, the operation of the taking lens 10, the aperture stop 31, and the CCD 36 are controlled by the CPU 33, and thus the preparatory processes are performed.

Figure 4:
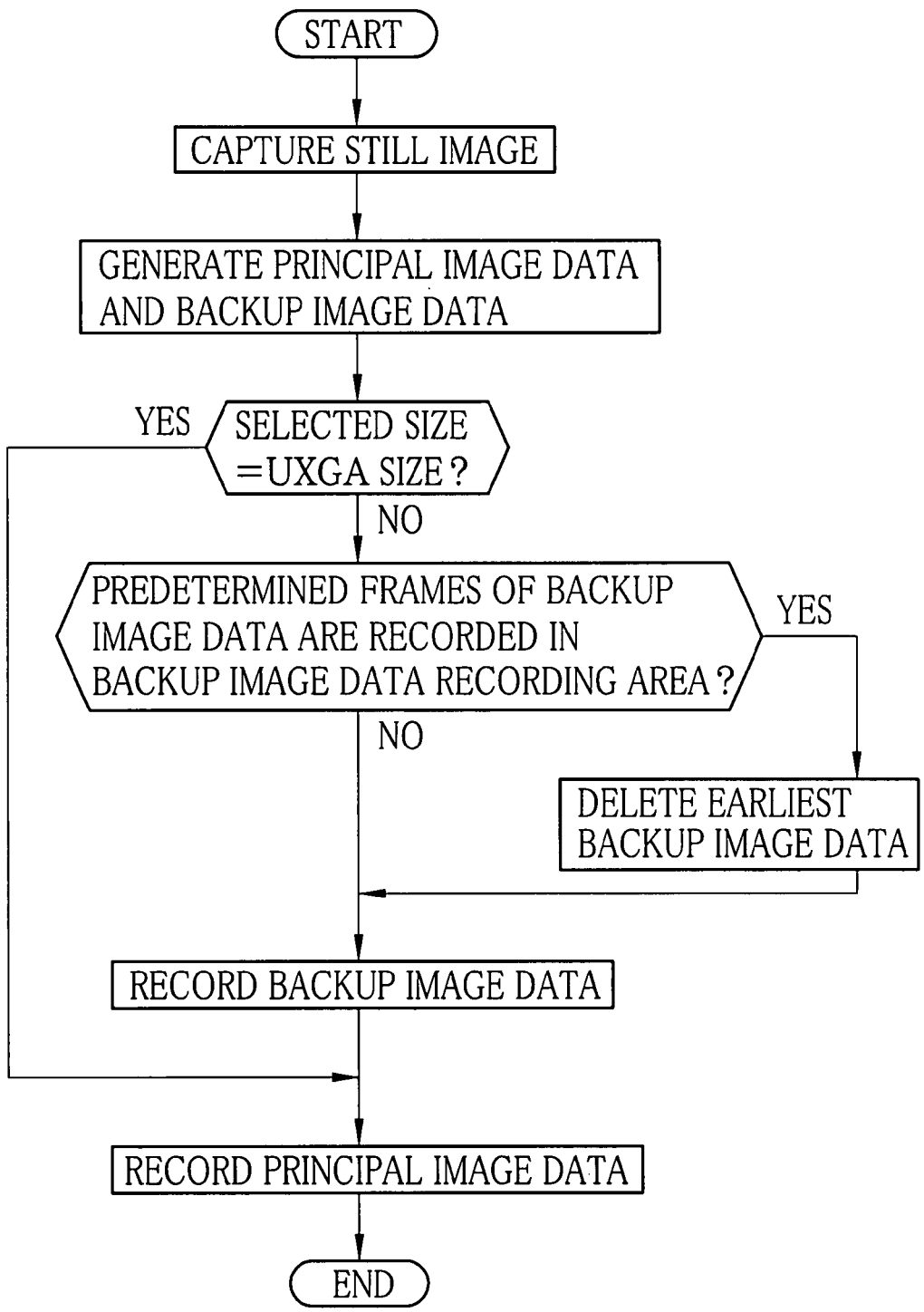
FIG. 4 is a flow chart showing steps for recording principal image data and backup image data.

Next, with the full press of the release button 13, a still image is captured with the determined exposure amount, and the obtained CCD-RAW data is stored in the SDRAM 41. As shown in FIG. 4, the CCD-RAW data stored in the SDRAM 41 is read to the digital signal processing section 42 and subjected to various image processing, and then output from the resize processing section 43 as principal image data and backup image data.

The principal image data and the backup image data are stored in the SDRAM 41, and then read to the YC conversion processing section 44 in which the regular YC processing is performed. Thereafter, the principal image data and the backup image data are compressed in the compression/decompression processing section 45, and then stored in the SDRAM 41 again. The principal image data and the backup image data are read to the external memory control section 48 and the internal memory control section 46 respectively. Under the control of the external memory control section 48 and the internal memory control section 46, the principal image data and the backup image data are recorded in the memory card 49 and the internal memory 47 respectively.

If the size of the image data selected by the user in the still image capture mode is the UXGA which is the same size as the backup image data, only the principal image data is recorded without recording the backup image data. If the predetermined number of frames of the backup image data has already been recorded in the backup image data recording area, the internal memory control section 46 deletes the earliest backup image data and records the latest backup image data.

The replay mode is selected with the pressing of the replay button 23. In the replay mode, the principal image data recorded in the memory card 49 is transferred to the SDRAM 41. Then, the principal image data is read from the SDRAM 41 to the compression/decompression processing section 45, and decompressed to the original size, and stored in the SDRAM 41 again. The principal image data read from the SDRAM 41 is displayed on the LCD 18 by the LCD driver 50.

Figure 5:
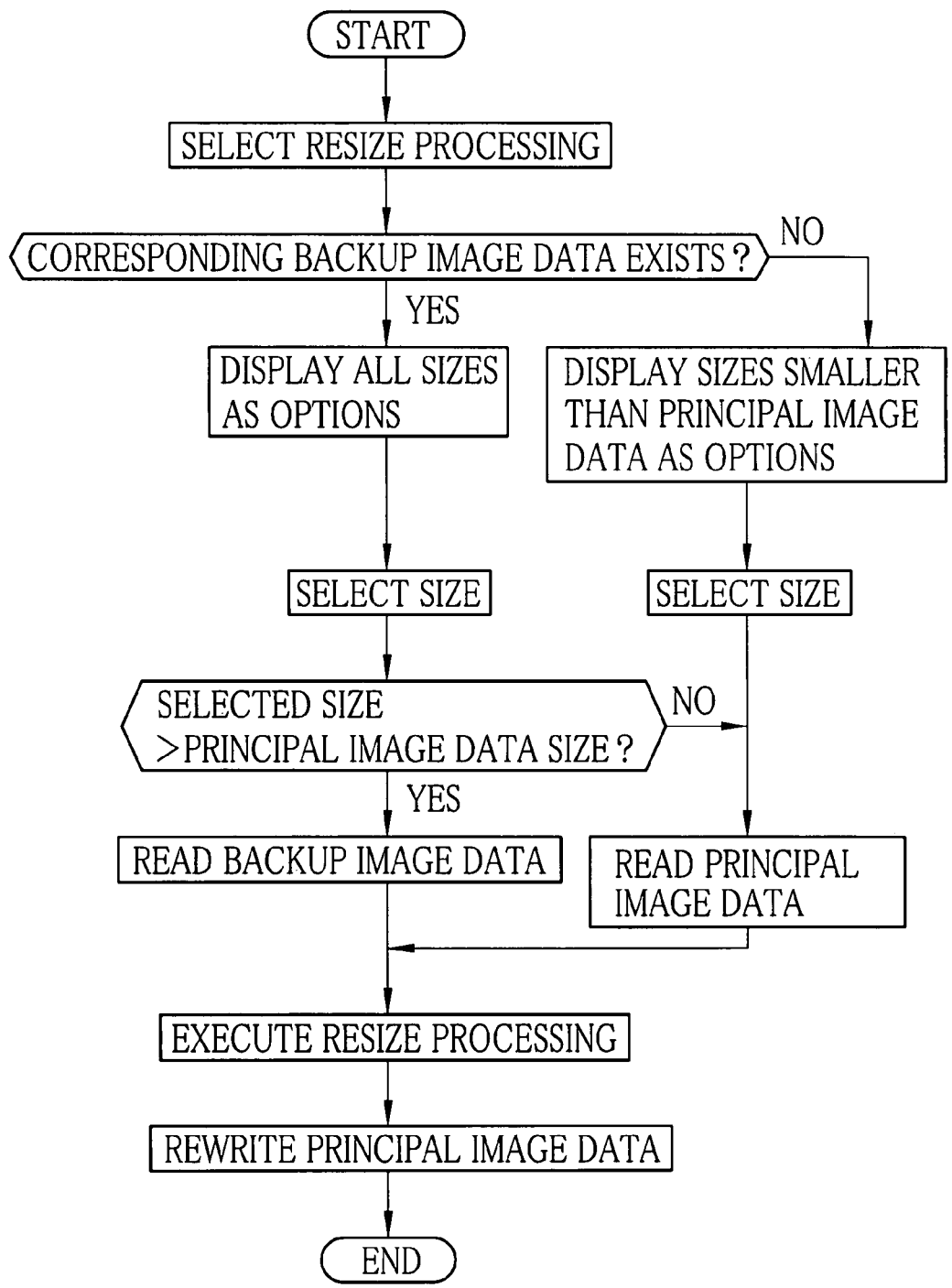
FIG. 5 is a flow chart showing steps of resize processing.
Figure 6A:
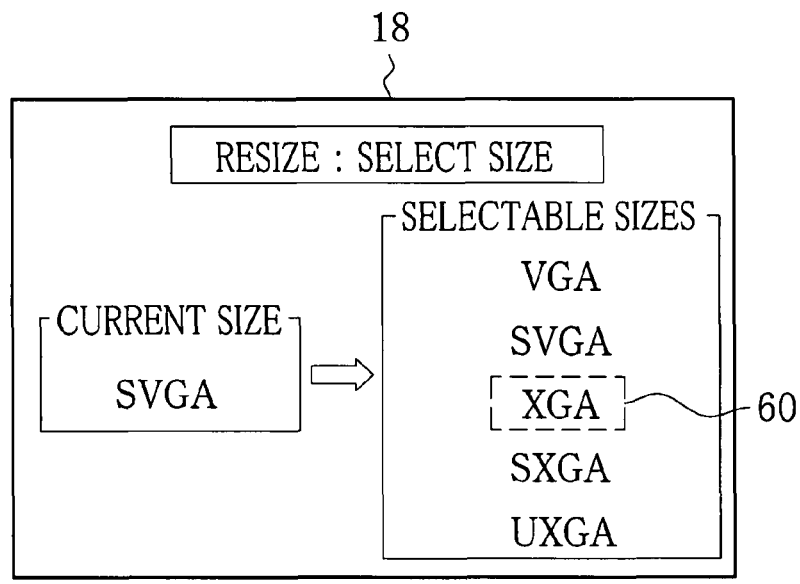

In FIG. 5, in the replay mode, if the resize processing is selected with the operation of the operation unit 19, first, the backup image data corresponding to the principal image data is searched in the internal memory 47. If the corresponding backup image data is found, as shown in FIG. 6A, all sizes are displayed on the LCD 18 as selectable options.

Figure 6B:
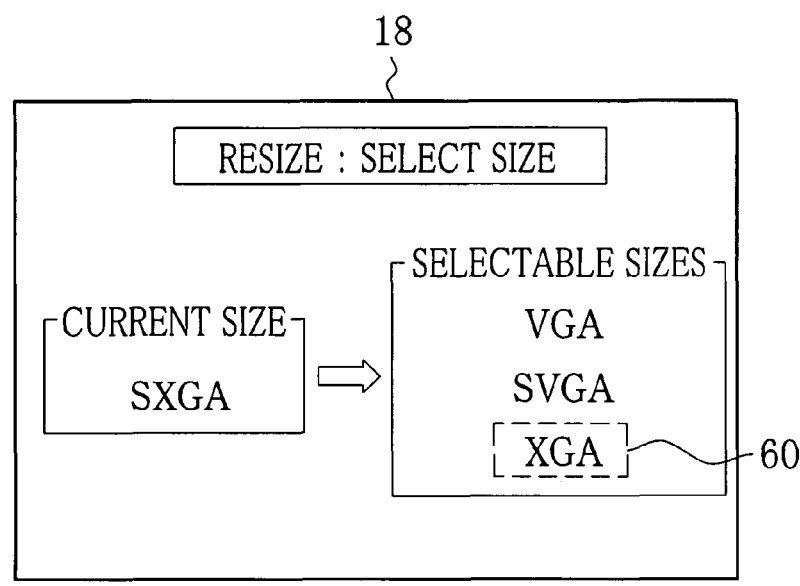

On the other hand, if the corresponding backup image data has not been recorded, the LCD 18 displays the sizes smaller than that of the principal image data as selectable options. In the case where the size of the principal image data is the SXGA, the LCD 18 displays the VGA, SVGA, and XGA as the selectable options as shown in FIG. 6B. The user operates the operation unit 19 to put a cursor 60 onto one of the selectable options to select the size.

Referring back to FIG. 5, if the backup image data corresponding to the principal image data has not been recorded, or the size selected by the user is smaller than the principal image data regardless of the presence of the backup image data, the principal image data is read from the memory card 49 to the resize processing section 43, and subjected to the resize processing therein.

On the other hand, if the backup image data corresponding to the principal image data has been recorded, and the size selected by the user is larger than the principal image data, the backup image data is read from the internal memory 47 to the resize processing section 43, and subjected to the resize processing therein. Thereafter, the external memory control section 48 deletes the original principal image data from the memory card 49, and rewrites the resized backup image data as new principal image data.

Figure 7:
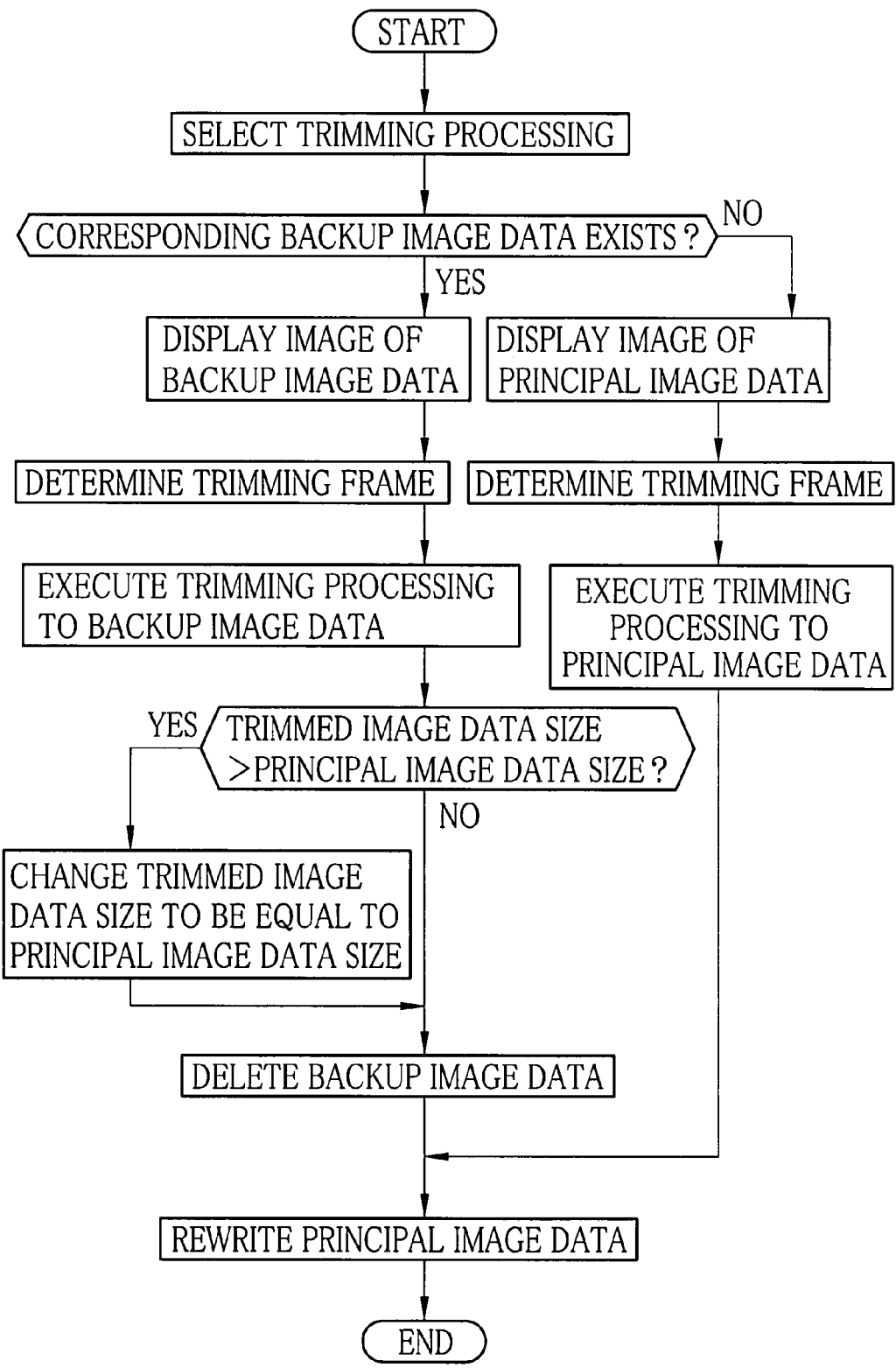
FIG. 7 is a flow chart showing steps of trimming processing.

In FIG. 7, in the replay mode, if the trimming processing is selected with the operation of the operation unit 19, the backup image data corresponding to the principal image data is searched in the internal memory 47 in the same manner as the above resize processing. If the corresponding backup image data is found, the image of the backup image data is displayed on the LCD 18.

Figure 8:
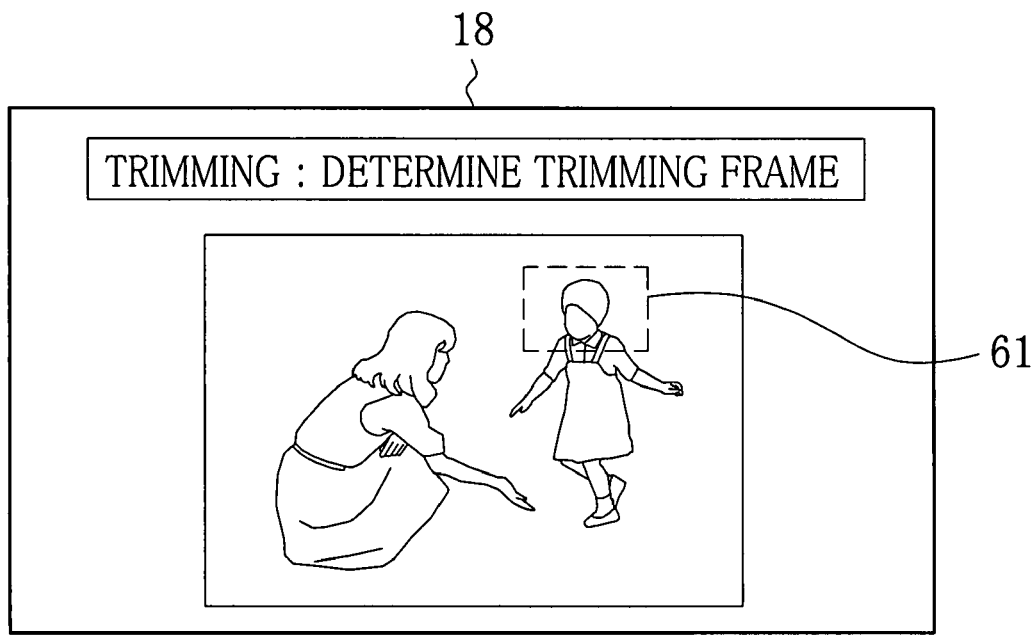
FIG. 8 is an example of display on the LCD in the trimming processing.

On the other hand, if the backup image data has not been recorded, the image of the principal image data is displayed on the LCD 18. As shown in FIG. 8, the user operates the operation unit 19 to determine the area of the image to be cut out with a trimming frame 61.

In FIG. 7, after the trimming frame 61 is determined, the trimming processing in which the image is trimmed along the trimming frame 61 in the trimming processing section 51 is performed to the backup image data when the backup image data has been recorded, or to the principal image data when the backup image data has not been recorded.

If the trimming processing has been performed to the backup image data and the size of the trimmed backup image data is larger than that of the principal image data, the size of the trimmed backup image data is changed to be the same as that of the principal image data.

After the trimming processing, the external memory control section 48 deletes the original principal image data from the memory card 49, and rewrites the trimmed image data as new principal image data. If the trimming processing has been performed to the backup image data, the internal memory control section 46 deletes the original backup image data used for the trimming processing from the internal memory 47.

Figure 9:
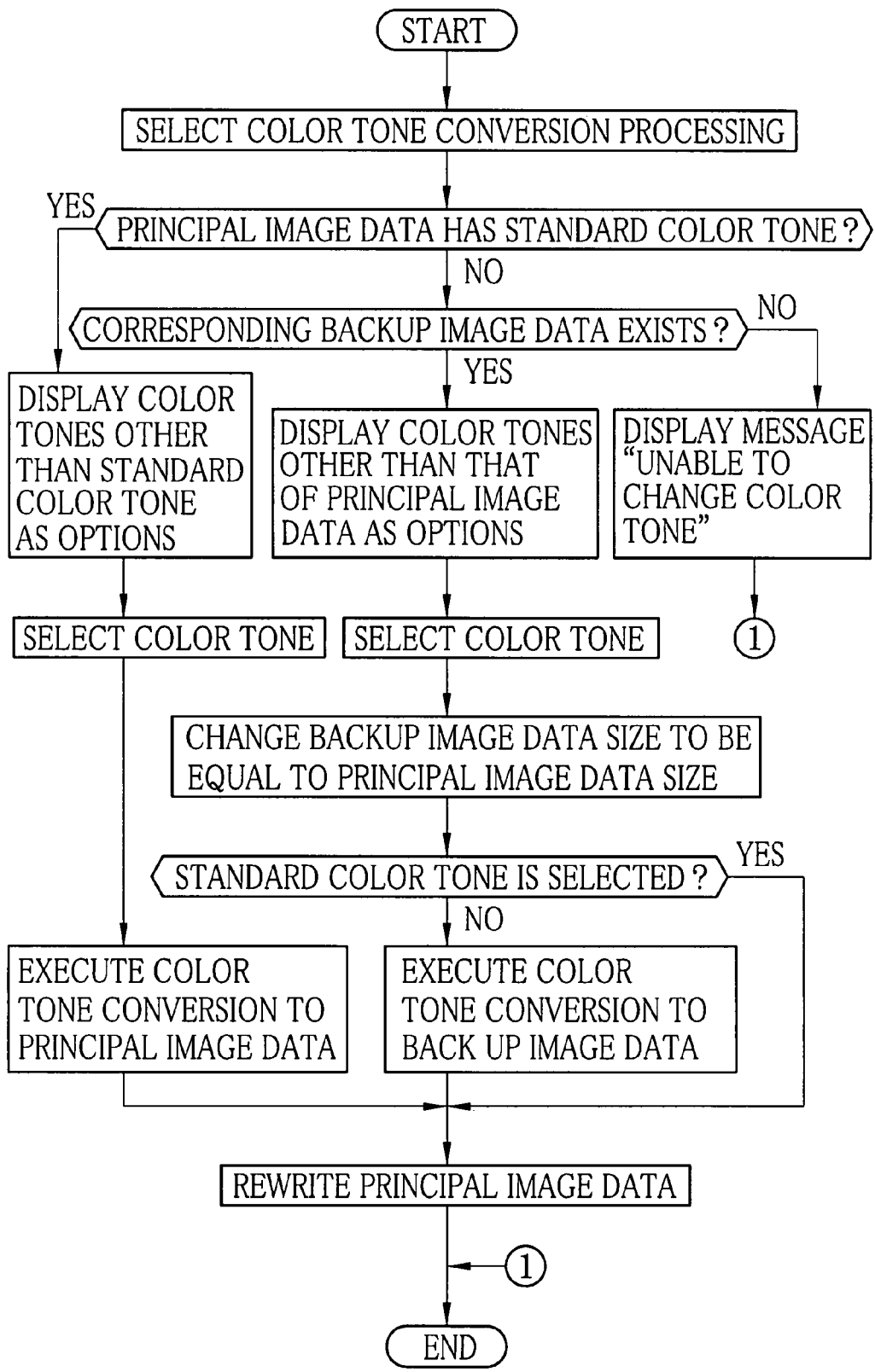
FIG. 9 is a flow chart showing steps of color tone processing.
Figure 10A:
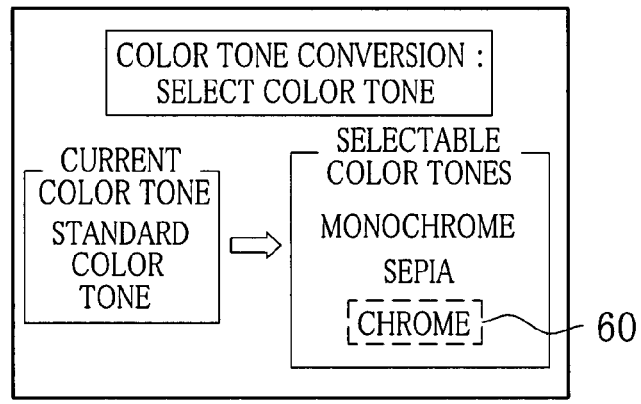

In FIG. 9, in the replay mode, the color conversion processing is selected with the operation of the operation unit 19. If the color tone of the principal image which will be subjected to the color tone conversion processing is standard color tone, the color tones other than the standard color tone, that is, as shown in FIG. 10A, the monochrome, sepia and chrome, are displayed as the selectable options on the LCD 18.

Figure 10B:
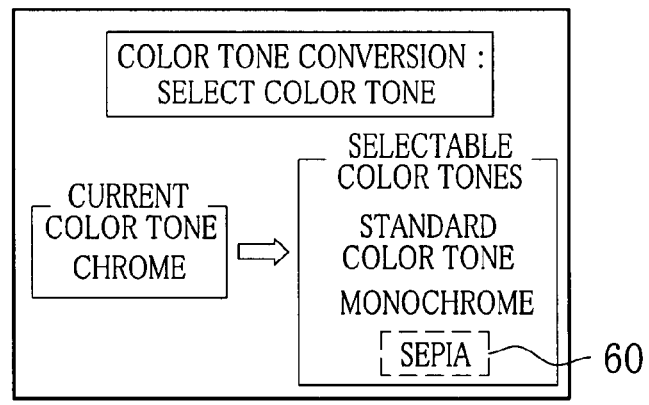
Figure 10C:
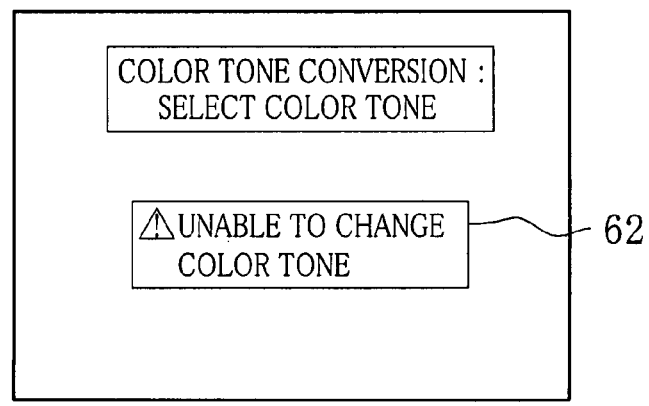

If the color tone of the principal image is other than the standard color tone, and the backup image corresponding to the principal image has been recorded, the color tones other than that of the principal image, in this case, as shown in FIG. 10B, the standard color tone, monochrome, and sepia are displayed as the selectable options on the LCD 18. The user operates the operation unit 19 to put the cursor 60 on a desired color tone. If the color tone of the principal image is other than the standard color tone, and the backup image corresponding to the principal image has not been recorded, a dialogue 62 indicating that the color tone is unable to change is displayed on the LCD 18 as shown in FIG. 10C.

In FIG. 9, if the color tone of the principal image is standard color tone, when the color tone is selected with the operation of the operation unit 19, the color tone conversion processing is performed to the principal image in the color tone conversion processing section 52.

On the other hand, the color tone of the principal image is other than the standard color tone and the backup image corresponding to the principal image has been recorded, the size of the backup image is changed to be the same as that of the principal image in the resize processing section 43. If the selected color tone is other than the standard color tone, the corresponding backup image is subjected to the color tone conversion processing in the color tone conversion processing section 52. After the color tone conversion processing, the external memory control section 48 deletes the original principal image from the memory card 49, and records the backup image after the color tone conversion processing or the resize processing as new principal image.

Further, if the selected color tone is the standard color tone when the color tone of the principal image is other than the standard color tone and the backup image corresponding to the principal image has been recorded, the backup image with the size changed to be the same as that of the principal image is rewritten as new principal image data.

As described above, since the backup image data is recorded in the internal memory 47, the backup image data is efficiently utilized in the resize processing, the trimming processing, and the color conversion processing performed after the image is captured.

With the use of the backup image data, it becomes possible to change the size of the principal image data to a larger size after the image is captured. Accordingly, even if the image has been captured with a relatively small size by mistake, it is not necessary to recapture the image, or to give up recapturing and use the small-sized captured image. It is also possible to increase the image data size in the case the user is intentionally capturing the image with a small image size and unexpectedly captures a best scene.

Further, if the backup image data is used for the trimming processing, image quality degradation due to the trimming processing is avoided. Moreover, it has been impossible to restore the color tone of the image to the standard color tone after the image is captured with a special color tone setting such as the monochrome, sepia, or chrome. However, with the use of the backup image data, it becomes possible to restore the color tone of the image captured with the special color setting to the standard color tone after the image is captured.

In the above embodiment, the backup image data recording area is provided only in the internal memory 47. Instead, or in addition, it is also possible to provide the backup image data recording area in the memory card 49. It is also possible to use the memory card 49 as a shared memory area in which both the principal image data and the backup image data are recorded while the backup image data recording area in the internal memory 47 is remained.

Figure 11:
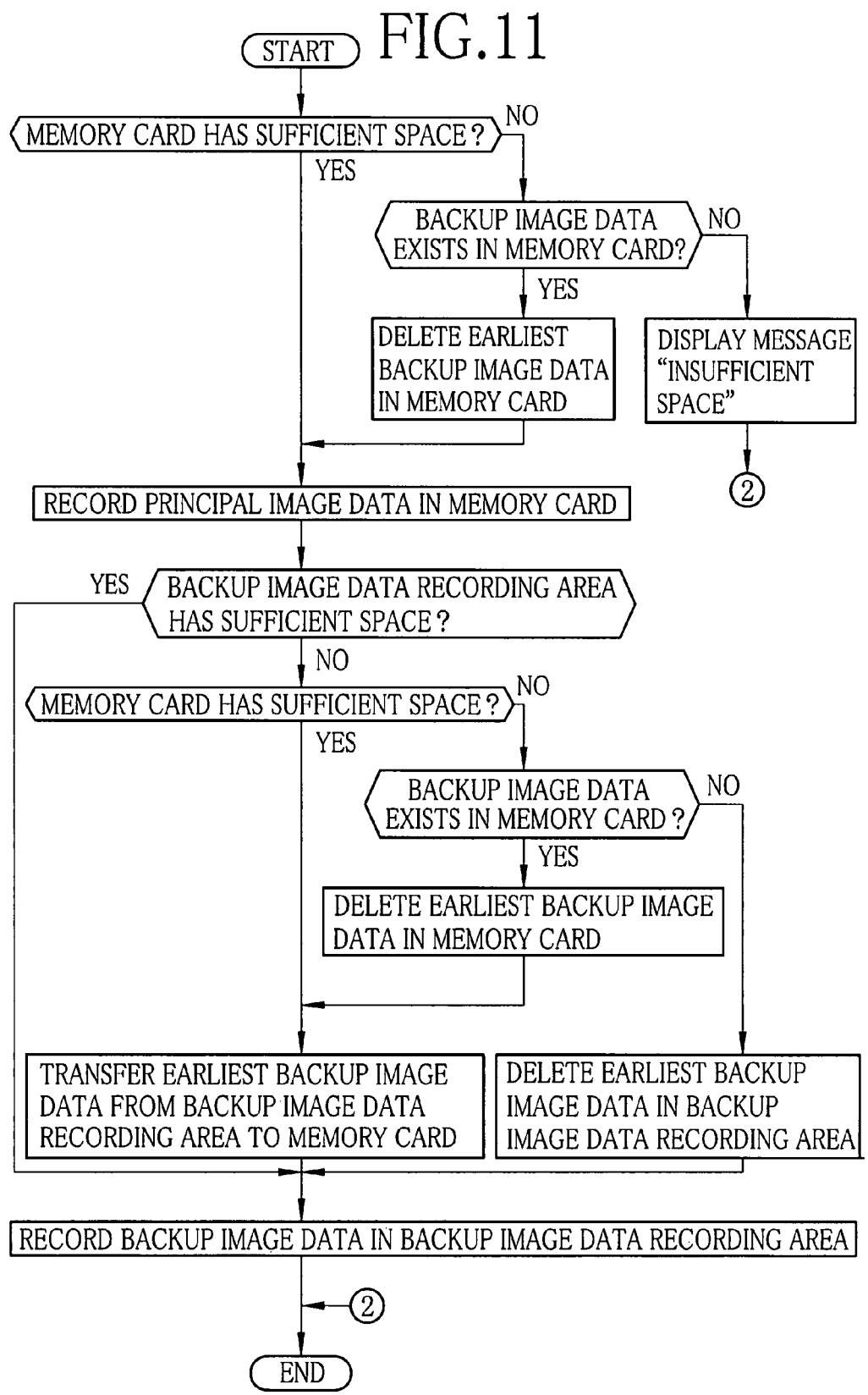
FIG. 11 is a flow chart showing steps for recording the principal image data and the backup image data in a memory card.
Figure 12:
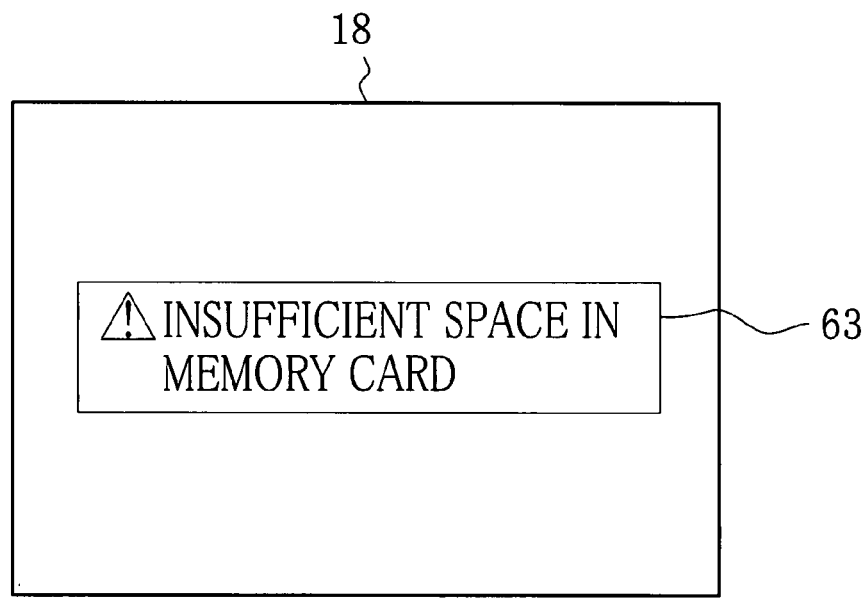
FIG. 12 is an example of a dialogue on the LCD indicating insufficient space in the memory card.

In FIG. 11, if the memory card 49 is used as the shared memory area, it is detected whether the memory card 49 has a sufficient space or not after the still image is captured. If the memory card 49 does not have a sufficient space, and the backup image data has not been recorded therein, a dialogue 63 indicating insufficient space in the memory card 49 is displayed on the LCD 18.

In FIG. 11, if the memory card 49 does not have the sufficient space, and the backup image data has been recorded in the memory card 49, the external memory control section 48 deletes the earliest backup image data from the memory card 49, and records the latest principal image data in the memory card 49. If the memory card 49 has the sufficient space, the latest principal image data is recorded in the memory card 49 without deleting the backup image data.

Thereafter, it is detected whether the backup image data recording area has the sufficient space or not. If the backup image recording area does not have the sufficient space and the memory card 49 has the sufficient space, the internal memory control section 46 and the external memory control section 48 transfer the earliest backup image data from the backup image data recording area to the memory card 49, and record the latest backup image data in the backup image data recording area.

If both the backup image data recording area and the memory card 49 do not have sufficient spaces, it is detected whether the backup image data has been recorded in the memory card 49. If the backup image data has been recorded in the memory card 49, the external memory control section 48 deletes the earliest backup image data from the memory card 49, and transfers the earliest backup image data from the backup image data recording area to the memory card 49, and records the latest backup image data in the backup image data recording area, in the same manner as the case where the backup image data recording area does not have the sufficient space and the memory card 49 has the sufficient space.

On the other hand, if the backup image data has not been recorded in the memory card 49, the internal memory control section 46 deletes the earliest backup image data from the backup image data recording area, and records the latest backup image data in the backup image data recording area. If the backup image data recording area has a sufficient space, the latest backup image data is recorded in the backup image data recording area without deleting the backup image data.

To summarize the steps shown in FIG. 11, if the backup image data recording area in the internal memory 47 does not have a sufficient space, and the memory card 49 has a sufficient space, the earliest backup image data in the backup image data recording area is transferred to the memory card 49, and the latest backup image data is recorded in the backup image data recording area which has now a space for recording. If both the backup image data recording area and the memory card 49 do not have sufficient spaces, the earliest backup image data is deleted from the memory card 49 or the internal memory 47, and the latest principal image data or the backup image data is recorded therein.

In other words, a higher priority is given to the recording of the principal image data than that of the backup image data so as to record as much principal image data as possible. Even after the predetermined number of frames of the backup image data has been recorded in the backup image data recording area, at least the predetermined number of frames of the backup image data is constantly kept in the backup image data recording area, that is, the total number of the frames of the backup image data in the backup image data recording area does not fall below the predetermined number. Until the memory card 49 runs out of the space and the earliest backup image data in the memory card 49 is deleted, all the backup image data is retained.

Figure 13:
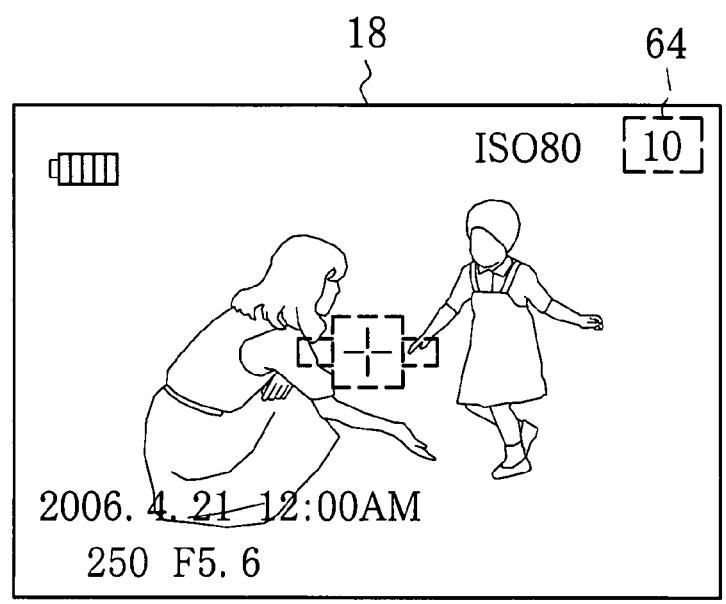
FIG. 13 is an example of a display on the LCD indicating an available frame number.

If the memory card 49 is used as the shared memory area and does not have a sufficient space, the backup image data recorded in the memory card 49 is deleted to record the principal image data. In this case, as shown in FIG. 13, the available frame number corresponding to the amount of the backup image data recorded in the memory card 49 is added to an available frame number 64 in the memory card 49 and displayed on the LCD 18.

Figure 14:
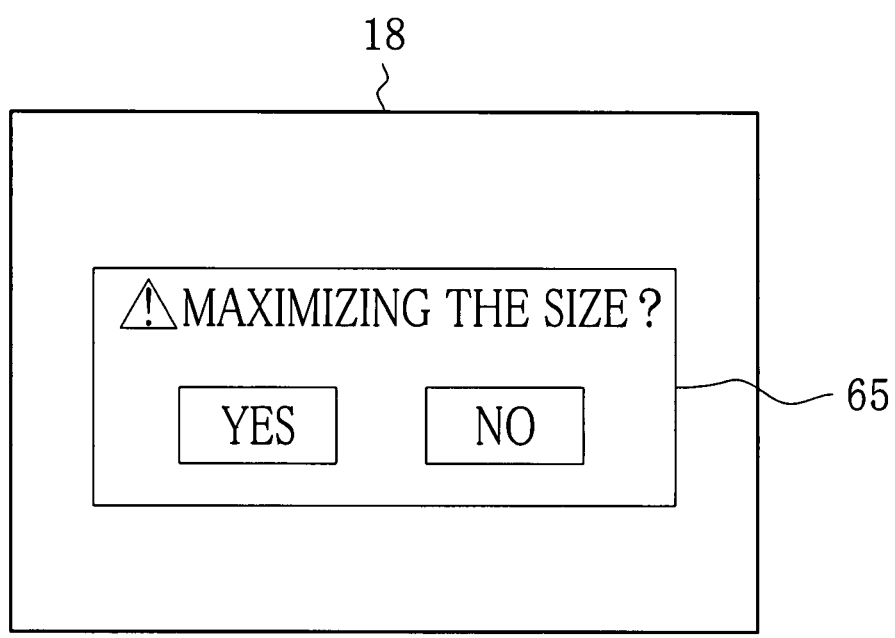
FIG. 14 is an example of a display on the LCD showing a dialogue asking whether to rewrite the principal image data with the backup image data.

It is also possible to let the user select whether to automatically replace the principal image data with the backup image data, for instance, with the pressing of the replay button 23 within a predetermined time after the still image is captured. In this case, with the pressing of the replay button 23, as shown in FIG. 14, a dialogue 65 asking the user whether to replace the principal image data with the backup image data is displayed on the LCD 18. When the user operates the operation unit 19 and selects "YES", the principal image data is canceled and the backup image data is recorded instead. Thus, the principal image data is replaced with the backup image data right after the still image is captured, which allows the user to skip complex steps such as changing to the replay mode, selecting the resize processing, and selecting the image data size.

In the above embodiment, the image data with the maximum size is recorded as the backup image data. However, it is acceptable if the backup image data has a larger size than the principal image data. It is also possible to record the CCD-RAW data as the backup image data.

In the above embodiment, the digital camera 2 is used as an example of the image capture apparatus. However, the present invention is not limited to the above. It is also possible to apply the present invention to the other image capture apparatuses such as a mobile phone with a camera.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image capture apparatus for converting an image of a subject into an image signal with an image sensor and generating digital image data from said image signal, said image capture apparatus comprising:

an image processing section for generating principal image data of a predetermined size and backup image data of a size larger than said principal image data as said image data;

a memory for storing said principal image data and said backup image data;

a memory control section for controlling operation of said memory;

a first resize processing section for performing a resizing processing to change a size of said image data stored in said memory, wherein said first resize processing section performs said resize processing to said backup image data if a size of said image data after said resize processing becomes larger than said size of said principal image data; and wherein said first resize processing section performs said resize processing to said principal image data if a size of said image data after said resize processing becomes smaller than said size of said principal image data.

2. An image capture apparatus according to claim 1, wherein said memory has a backup image recording area for recording a predetermined number of frames of said backup image data.

3. An image capture apparatus according to claim 2, wherein if said backup image data recording area does not have a sufficient space, said memory control section deletes earliest backup image data and records latest backup image data in said backup image data recording area.

4. An image capture apparatus according to claim 2, wherein said memory is an internal memory incorporated in a main body of said image capture apparatus.

5. An image capture apparatus according to claim 2 further comprising:
a first operation unit for changing a recordable frame number of said backup image data in said backup image data recording area.

6. An image capture apparatus according to claim 5 further comprising:
a second operation unit for deleting all of said backup image data at once.

7. An image capture apparatus according to claim 1, wherein said backup image data is image data of a maximum size or RAW data obtained by performing analog signal processing and A/D conversion to said image signal.

8. An image capture apparatus for converting an image of a subject into an image signal with an image sensor and generating digital image data from said image signal, said image capture apparatus comprising:
an image processing section for generating principal image data of a predetermined size and backup image data of a size larger than said principal image data as said image data;
a memory for storing said principal image data and said backup image data; and
a memory control section for controlling operation of said memory;
wherein said memory has a backup image data recording area for recording a predetermined number of frames of said backup image data, and a shared memory area in which both said principal image data and said backup image data are recorded;
wherein if said backup image recording area does not have a sufficient space and said shared memory area has a sufficient space, said memory control section transfers earliest backup image data from said backup image data recording area to said shared memory area, and records latest backup image data in said backup image data recording area.

9. An image capture apparatus according to claim 8, wherein if said shared memory area does not have a sufficient space, said memory control section deletes said earliest backup image data and records latest principal image data or said latest backup image data in said shared memory area.

10. An image capture apparatus according to claim 8, wherein said memory includes an internal memory incorporated in a main body of said image capture apparatus and an external memory removably installed to said main body, and said internal memory has said backup image data recording area, and said external memory has said shared memory area.

11. An image capture apparatus according to claim 8 further comprising:
a display section for displaying a recordable frame number of said principal image, which is estimated from a remaining space in said memory, said display section displaying said recordable frame number added with a number of frames corresponding to an amount of said backup image data recorded in said shared memory area.

12. An image capture apparatus for converting an image of a subject into an image signal with an image sensor and generating digital image data from said image signal, said image capture apparatus comprising:
an image processing section for generating principal image data of a predetermined size and backup image data of a size larger than said principal image data as said image data;
a memory for storing said principal image data and said backup image data; and
a memory control section for controlling operation of said memory, wherein if said principal image data is designated to be the same size as said backup image data, said memory control section only records said principal image data.

13. An image capture apparatus for converting an image of a subject into an image signal with an image sensor and generating digital image data from said image signal, said image capture apparatus comprising:
an image processing section for generating principal image data of a predetermined size and backup image data of a size larger than said principal image data as said image data;
a memory for storing said principal image data and said backup image data; and
a memory control section for controlling operation of said memory, further comprising:
a trimming processing section for performing a trimming processing to trim a part of an image to said backup image data; and
further comprising:
a resize processing section for changing said trimmed backup image data to be the same size as said principal image data if said trimmed backup image data being larger than said principal image data.

14. An image capture apparatus for converting an image of a subject into an image signal with an image sensor and generating digital image data from said image signal, said image capture apparatus comprising:
an image processing section for generating principal image data of a predetermined size and backup image data of a size larger than said principal image data as said image data;
a memory for storing said principal image data and said backup image data; and
a memory control section for controlling operation of said memory; and
further comprising:
a color conversion processing section for converting a color tone of said image data from a standard color tone into other color tone,
wherein in the case a color tone of said principal image data is converted into said other color tone in said color conversion processing section and recorded in said memory, said memory control section restores said color tone of said principal image data to said standard color tone by rewriting said principal image data with said backup image data having said standard color tone as new principal image data.

15. An image capture apparatus according to claim 14 further comprising:
a resize processing section for changing said backup image data to be the same size as said principal image data when said color tone of said principal image data is restored to said standard color tone.

16. An image capture apparatus for converting an image of a subject into an image signal with an image sensor and generating digital image data from said image signal, said image capture apparatus comprising:
- an image processing section for generating principal image data of a predetermined size and backup image data of a size larger than said principal image data as said image data;
- a memory for storing said principal image data and said backup image data; and
- a memory control section for controlling operation of said memory; and further comprising:
- an operation unit for allowing a user to select whether to automatically replace said principal image data with said backup image data at the time of recording said principal image data and said backup image data in said memory after an image being captured.

* * * * *